United States Patent [19]

Seo et al.

[11] Patent Number: 5,715,344
[45] Date of Patent: Feb. 3, 1998

[54] CORE FOR USE IN A SLOT TYPE OPTICAL CABLE

[75] Inventors: Gi-Won Seo; Ho-Seop Han, both of Incheon, Rep. of Korea

[73] Assignee: Daewoo Telecom, Ltd., incheon, Rep. of Korea

[21] Appl. No.: 738,363

[22] Filed: Oct. 25, 1996

[30] Foreign Application Priority Data

Oct. 31, 1995 [KR] Rep. of Korea .................. 1995-31824

[51] Int. Cl.⁶ ........................................................ G02B 6/44
[52] U.S. Cl. .................... 385/110; 385/100; 385/103; 385/105; 385/112; 385/113; 385/114
[58] Field of Search .............................. 385/100, 103, 385/105, 106, 110, 112, 113, 114

[56] References Cited

U.S. PATENT DOCUMENTS

| | | | |
|---|---|---|---|
| 4,401,366 | 8/1983 | Hope | 385/110 X |
| 4,596,443 | 6/1986 | Diemeer et al. | 385/110 X |
| 4,997,257 | 3/1991 | Spedding | 385/110 X |
| 5,218,659 | 6/1993 | Schneider | 385/110 |
| 5,222,177 | 6/1993 | Chu et al. | 385/105 |
| 5,420,955 | 5/1995 | Cooke et al. | 385/110 |
| 5,487,126 | 1/1996 | Oestreich et al. | 385/105 |
| 5,542,109 | 7/1996 | Pascher | 385/105 |
| 5,638,478 | 6/1997 | Iwakura et al. | 385/111 |

*Primary Examiner*—Brian Healy
*Attorney, Agent, or Firm*—Pennie & Edmonds, LLP

[57] ABSTRACT

A core for use in a slot type optical cable has one or more regularly disposed slots. One or more ribbon fibers are stacked into each of the slots, each of the ribbon fibers having a plurality of optical fibers. A tensile strength member is disposed at a center of the core. Each of the slots has a convex bottom surface with a predetermined curvature so that voids between the ribbon fiber at the bottom of the stack and top of the convex bottom surface in each of the slots are formed on both sides of the convex bottom surface. The convex bottom surface is provided with curvature whose radius is equal to or less than a distance from the center of the core to edges defined by the convex bottom surface meeting the pair of side surfaces in each of the slots.

2 Claims, 3 Drawing Sheets

FIG.2
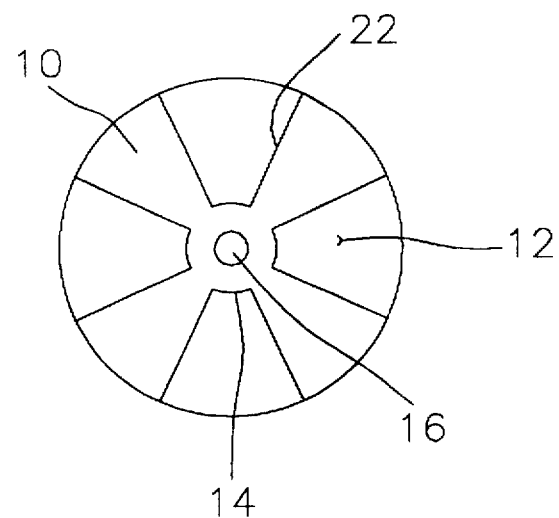
FIG.3A
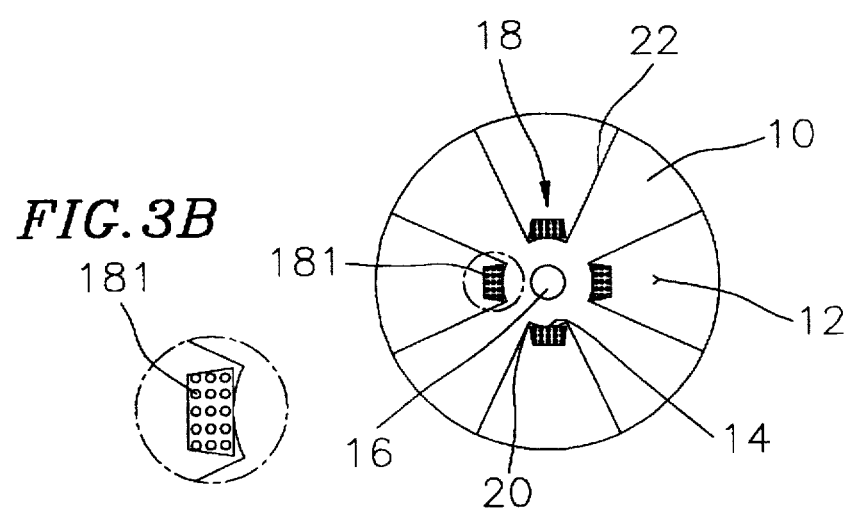
FIG.3B

CORE FOR USE IN A SLOT TYPE OPTICAL CABLE

FIELD OF THE INVENTION

The present invention relates to a core for use in a slot type optical cable; and, more particularly, to a core capable of minimizing a transmission loss and preventing a decline in mechanical strength in optical fibers during bending the cable.

DESCRIPTION OF THE PRIOR ART

As is well known, in an optical communications system, a light wave and an optical fiber are used as a communication medium and a transmission medium, respectively. In other words, the light wave carrying information is transmitted through the optical fiber. In general, optical cables can be classified into a loose type and a slot type depending on the manner in which the optical fibers therein are packed.

The loose type optical cable includes a plurality of loose tubes, each of which, in turn, is packed with a plurality of optical fibers and is effective for protecting the optical fibers from the external environment, but it has a major shortcoming in that it is difficult to gain access to an individual optical fiber due to an inherent structure thereof.

In contrast, the slot type optical cable is provided with one or more cores, each of the cores, in turn, containing one or more slots and being wrapped around with a sheath. Further, there are provided, in each of the slots, stacked optical ribbon fibers, each of stacked optical ribbon fibers having a plurality of optical fibers. It is relatively easy, in comparison to the loose type optical cable, to gain access to an individual optical fiber in the slot type optical cable by simply removing the sheath.

There is illustrated in FIG. 1 a cross sectional view of a typical core 10 for use in the slot type optical cable. The core 10 shown includes four regularly disposed slots 12, each of the slots being provided with one or more stacked optical ribbon fibers, and a central tensile strength member 16 for providing support for the core 10.

However, the slot type optical cable has a major disadvantage in that when the optical cable is bent, the transmission loss increases and the mechanical strength of the optical fibers therein decreases.

SUMMARY OF THE INVENTION

It is, therefore, a primary object of the invention to provide an improved core for use in a slot type optical cable capable of minimizing a transmission loss and of preventing a decrease in mechanical strength in the optical fibers when the optical cable is subjected to a bending.

In accordance with a preferred embodiment of the present invention, there is provided a core for use in a slot type optical cable, the core comprising:

one or more regularly disposed slots;

one or more ribbon fibers stacked into each of the slots, each of the ribbon fibers having a plurality of optical fibers; and a tensile strength member disposed at a center of the core, wherein each of the slots has a convex bottom surface with a predetermined curvature and a pair of side surfaces so that voids between the ribbon fiber at bottom of the stack of the ribbon fibers and top of the convex bottom surface are formed on both sides of the convex bottom surface when the optical cable is not bent.

BRIEF DESCRIPTION OF THE DRAWINGS

The above and other objects, features and advantages of the present invention will become apparent from the following detailed description, when taken in conjunction with the accompanying drawings, in which:

FIG. 2 provides a cross sectional view of a core for use in a slot type optical cable in accordance with the present invention;

FIG. 3 describes a cross sectional view of the inventive core of FIG. 2 with ribbon fibers inserted into each of the slots when the cable is not bent.

DETAILED DESCRIPTION OF THE PREFERRED EMBODIMENTS

Figure 1:
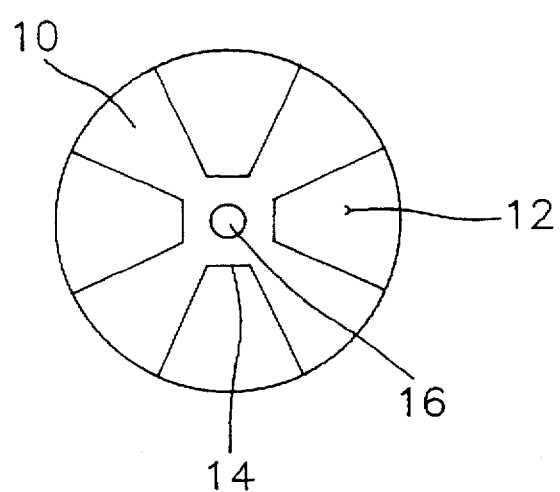
FIG. 1 shows a cross sectional view of a typical core for use in a slot type optical cable.
Figure 4:
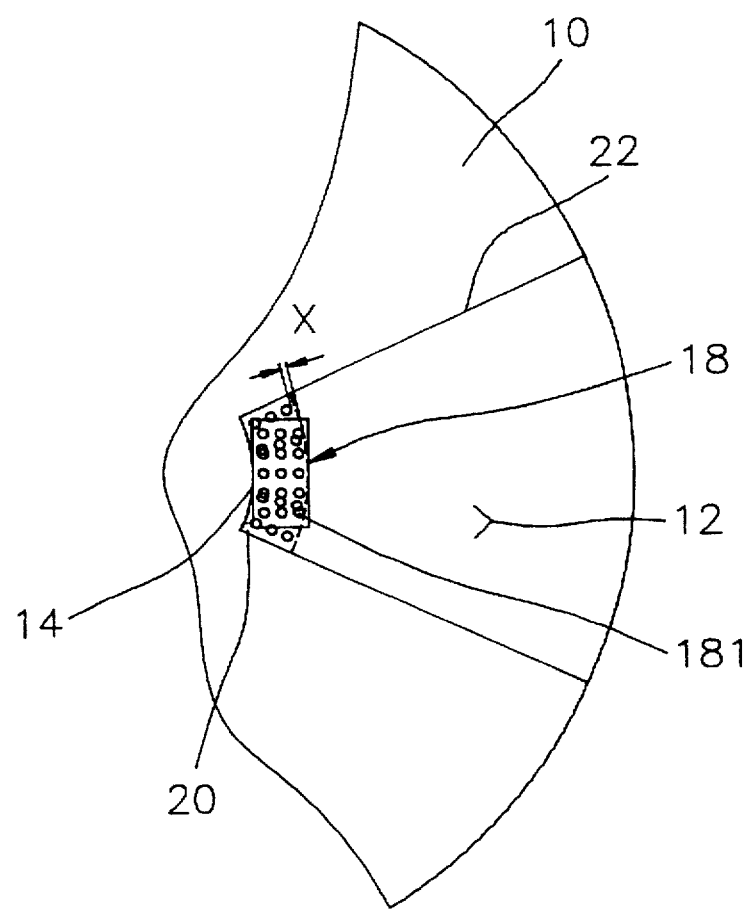
FIG. 4 offers a cross sectional view of the core of FIG. 3 when it is bent.

Referring now to FIG. 2, there is shown an inventive core having four slots, in accordance with a preferred embodiment of the invention, wherein each of the slots has a convex bottom surface and a pair of side surfaces. The following discussions are primarily directed to the convex bottom surface in each of the slots of the present invention by using FIGS. 2 to 4.

As shown in FIG. 2, the convex bottom surface 14 of each of the slots 12 is formed with a curvature whose radius is equal to or less than a distance from a center of the core to slot edges formed by the joint line of the convex bottom surface 14 meeting the pair of side surfaces 22 of the slot 12.

When the optical cable is straight, no tension is applied to the optical fibers 181 in the ribbon fibers 18 stacked in the slots 12 of the core 10 as shown in FIG. 3. As a result, the ribbon fibers 18 at the bottom of the stack are in contact with a middle portion of the convex bottom surface 14 and the ribbon fibers 18 stay planar. Further, voids 20 between the ribbon fiber 18 at the bottom of the stack and the convex bottom surface 14 are formed on both sides of the convex bottom surface 14.

On the other hand, when the optical cable is bent, a large tension is applied onto the optical fibers 181, the largest tension being applied onto the optical fibers positioned farthest from the optical fibers located at the middle of each of the ribbon fibers 18, i.e., the optical fibers positioned nearest to the side surface 22 of the slot 12, since they have the largest bending curvature of the cable. In other words, the tension applied on the optical fibers 181 progressively increases as the optical fibers 181 move closer to the side surfaces 22 of each of the slot 12. In order to alleviate the tension applied thereto, there is a tendency for the optical fibers 181 to move toward the center of the core as indicated by the dashed lines in FIG. 4, which is equivalent to reducing the bending curvature. The displacement of the optical fibers 181 toward the center of the core due to the above mentioned tendency is proportional to the tension applied thereto, and the displacement is accommodated by the voids 20.

If a large enough tension is applied on the optical fibers 181, the optical fibers positioned farthest from the middle of the ribbon fiber 18 at the bottom of the stack will come into contact with the convex bottom surface 14 of the slots 12. In such a situation, the bending curvature is reduced by an amount corresponding to the displacement X shown in FIG.

4, and by reducing the bending curvature, the difference in tension applied to the optical fibers 181 located at the middle of the ribbon fiber 18 and those located further away from the middle of the ribbon fiber 18 is negated, to thereby minimizing the transmission loss and preventing the decline in the mechanical strength in optical fibers.

Although the invention has been shown and described with respect to the preferred embodiments, it will be understood by those skilled in the art that certain changes and modifications may be made without departing from the spirit and scope of the invention as defined in the following claims.

What is claimed:

1. A core for use in a slot type optical cable, the core comprising:

one or more regularly disposed slots;

one or more ribbon fibers stacked into each of the slots, each of the ribbon fibers having a plurality of optical fibers; and a tensile strength member disposed at a center of the core, wherein each of the slots has a convex bottom surface with a predetermined curvature and a pair of side surfaces so that voids between the ribbon fiber at bottom of the stack of the ribbon fibers and top of the convex bottom surface are formed on both sides of the convex bottom surface when the optical cable is not bent.

2. The core according to claim 1, wherein the convex bottom surface is provided with curvature whose radius is equal to or less than a distance from a center of the core to edges formed by the joint line of the convex bottom surface meeting the pair of side surfaces in each of the slots.

* * * * *